United States Patent
Nanukuttan et al.

(10) Patent No.: US 9,970,414 B2
(45) Date of Patent: May 15, 2018

(54) PITCH ASSEMBLY FOR A WIND TURBINE ROTOR BLADE

(71) Applicant: General Electric Company, Schenectady, NY (US)

(72) Inventors: Biju Nanukuttan, Bangalore (IN); Rajanikanth Reddy Dasari, Bangalore (IN); Dhanesh Chandrashekar Pathuvoth, Bangalore (IN); Srikanth Samudrala, Bangalore (IN); Mohan Kumar Lakshminarayana, Bangalore (IN)

(73) Assignee: General Electric Company, Schenectady, NY (US)

( * ) Notice: Subject to any disclaimer, the term of this patent is extended or adjusted under 35 U.S.C. 154(b) by 172 days.

(21) Appl. No.: 14/788,966

(22) Filed: Jul. 1, 2015

(65) Prior Publication Data
US 2017/0002795 A1    Jan. 5, 2017

(51) Int. Cl.
*F03D 7/02* (2006.01)
*F03D 1/06* (2006.01)
*F03D 80/70* (2016.01)

(52) U.S. Cl.
CPC ......... *F03D 7/0224* (2013.01); *F03D 1/0658* (2013.01); *F03D 1/0666* (2013.01); *F03D 1/0675* (2013.01); *F03D 80/70* (2016.05); *F05B 2240/50* (2013.01); *F05B 2260/79* (2013.01); *Y02E 10/721* (2013.01)

(58) Field of Classification Search
CPC ........ F03D 1/0658; F03D 13/10; F03D 80/70; F03D 7/0224; F05B 2240/50; F05B 2260/79
See application file for complete search history.

(56) References Cited

U.S. PATENT DOCUMENTS 4,364,708 A * 12/1982 David ................... F03D 1/0658
                                                        416/132 B
4,668,109 A    5/1987 Basso
(Continued)

FOREIGN PATENT DOCUMENTS

| DE | 2825061 A1 | 12/1979 |
|---|---|---|
| EP | 2679816 A1 | 1/2014 |
| KR | 10-1337622 | 12/2013 |

OTHER PUBLICATIONS

European Search Report and Opinion issued in connection with corresponding EP Application No. 16175424.7 dated Nov. 16, 2016.

*Primary Examiner* — Jason Shanske
*Assistant Examiner* — Cameron Corday
(74) *Attorney, Agent, or Firm* — Dority & Manning, P.A.

(57) ABSTRACT

The present disclosure is directed to a pitch assembly for coupling a rotor blade to a hub of a wind turbine. In one embodiment, the pitch assembly includes a first pitch bearing having a first outer race and a first inner race rotatable relative to the first outer race via a first set of rolling elements, a second pitch bearing having a second outer race and a second inner race rotatable relative to the second outer race via a second set of rolling elements, and at least one spacer configured axially between and contacting the first and second pitch bearings. Further, at least a portion of the first pitch bearing and at least a portion of the second pitch bearing are axially aligned between the rotatable hub and the rotor blade in a generally span-wise direction.

8 Claims, 6 Drawing Sheets

(56) References Cited

U.S. PATENT DOCUMENTS

| | | | |
|---|---|---|---|
| 5,660,527 A | 8/1997 | Deering et al. | |
| 8,047,792 B2 | 11/2011 | Bech et al. | |
| 8,147,202 B2 | 4/2012 | Bech | |
| 8,469,664 B2 | 6/2013 | Madge et al. | |
| 2010/0086409 A1 | 4/2010 | Whiley et al. | |
| 2014/0003944 A1* | 1/2014 | Pasquet | F03D 80/70 416/147 |
| 2015/0016998 A1 | 1/2015 | Pasquet et al. | |
| 2015/0167632 A1* | 6/2015 | Gil Molla | F03D 1/065 416/204 R |
| 2017/0045032 A1* | 2/2017 | Jacobsen | F03D 1/0658 |

* cited by examiner

PITCH ASSEMBLY FOR A WIND TURBINE ROTOR BLADE

FIELD OF THE INVENTION

The present subject matter relates generally to wind turbines and, more particularly, to pitch assemblies for wind turbine rotor blades.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy from wind using known airfoil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

To ensure that wind power remains a viable energy source, efforts have been made to increase energy outputs by modifying the size and capacity of wind turbines. One such modification has been to increase the length of the rotor blades. However, as is generally understood, the loading on a rotor blade is a function of blade length, along with wind speed and turbine operating states. Thus, longer rotor blades may be subject to increased loading, particularly when a wind turbine is operating in high-speed wind conditions.

During the operation of a wind turbine, the loads acting on a rotor blade are transmitted through the blade and into the blade root. Thereafter, the loads are transmitted through a pitch bearing disposed at the interface between the rotor blade and the wind turbine hub. Typically, the hub has a much higher stiffness than the rotor blades. Thus, due to the varying (or non-homogeneous) stiffness, the loads are often not evenly distributed around the pitch bearing. As a result, the unequal load distribution may create areas of high loading in the pitch bearing, thereby resulting in higher stress and/or damage to the pitch bearing. For example, in certain embodiments, the pitch bearings may have a relatively large diameter (e.g. approximately 2 meters) and as the loads on the outer race vary over its surface, the outer race may acquire a shape similar to that of a potato chip (i.e. the potato chip effect).

Accordingly, the art is continuously seeking new and improved pitch assemblies that provide a more even load distribution so as to reduce the localized stress within the pitch bearing.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a rotor blade assembly for a wind turbine. The rotor blade assembly includes a rotatable hub, at least one rotor blade configured with the rotatable hub, and a pitch assembly coupling the rotor blade to the hub. The pitch assembly includes a first pitch bearing, a second pitch bearing, and at least one spacer configured axially between and contacting the first and second pitch bearings. The first pitch bearing includes a first outer race and a first inner race rotatable relative to the first outer race via a first set of rolling elements. The second pitch bearing includes a second outer race and a second inner race rotatable relative to the second outer race via a second set of rolling elements. Further, at least a portion of the first pitch bearing and at least a portion of the second pitch bearing are axially aligned between the rotatable hub and the rotor blade in a generally span-wise direction.

In one embodiment, the first and second pitch bearings define an overall height of the pitch assembly and the first and second sets of rolling elements are separated by a predetermined distance. Thus, in certain embodiments, a ratio of the predetermined distance to the overall height is at least about 0.5.

In another embodiment, the first and second outer races are secured to the rotatable hub and the first and second inner races are secured to the rotor blade. More specifically, in certain embodiments, the first and second outer and inner races may be mounted to the hub and the rotor blade, respectively, via one or more fasteners. Alternatively, the first and second outer races and the second inner race may be mounted to the hub via one or more fasteners and the first inner race may be secured to the blade root via an interference fit.

In additional embodiments, the rotor blade assembly may include a first spacer configured between the first and second outer races and a second spacer configured between the first and second inner races. Thus, in certain embodiments, the first and second spacers may be configured to form at least one continuous surface with the first and second outer races and/or the first and second inner races of the first and second pitch bearings, respectively. In particular embodiments, the spacer(s) may include a generally circular shape corresponding to the cross-sectional shape of either the first or second inner or outer races.

In further embodiments, the first outer race may be axially aligned with the second outer race in the span-wise direction. In additional embodiments, the first and second sets of rolling elements may be axially aligned in the span-wise direction.

Further, in certain embodiments, the first and second pitch bearings may be the same size or may be different sizes. For example, in one embodiment, the first pitch bearing may be smaller than the second pitch bearing or vice versa.

In another aspect, the present subject matter is directed to a pitch assembly for a wind turbine. The pitch assembly includes a first pitch bearing, a second pitch bearing, and at least one spacer configured axially between and contacting the first and second pitch bearings. The first pitch bearing includes a first outer race and a first inner race rotatable relative to the first outer race via a first set of rolling elements. The second pitch bearing includes a second outer race and a second inner race rotatable relative to the second outer race via a second set of rolling elements. Further, at least a portion of the first pitch bearing and at least a portion of the second pitch bearing are axially aligned between the rotatable hub and the rotor blade in a generally span-wise direction. It should be understood that the pitch assembly may be further configured with any of the additional features as described herein.

In yet another aspect, the present disclosure is directed to a rotor blade assembly for a wind turbine. The rotor blade assembly includes a rotatable hub, at least one rotor blade configured with the rotatable hub, and a pitch assembly coupling the rotor blade to the hub. The pitch assembly includes an outer race and an inner race rotatable relative to the outer race via a plurality of rolling elements. The plurality of rolling elements includes a first row of rolling elements and a second row of rolling elements. The first and second rows of rolling elements are axially aligned in a generally span-wise direction of the rotor blade. In addition, the inner and outer races define an overall height of the pitch assembly and the first and second rows of rolling elements are separated by a predetermined distance. Further, a ratio of the predetermined distance to the overall height is at least about 0.5. It should be understood that the rotor blade assembly may be further configured with any of the additional features as described herein.

These and other features, aspects and advantages of the present invention will be further supported and described with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
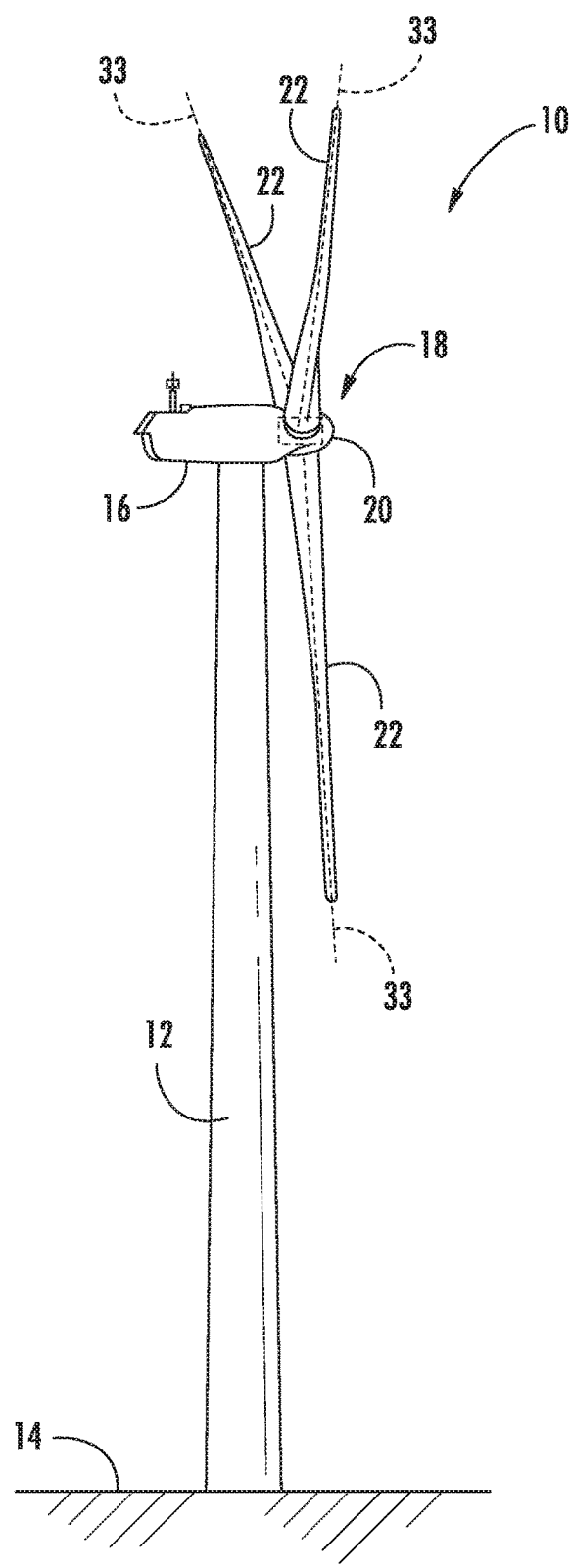
FIG. 1 illustrates a perspective view of one embodiment of a wind turbine according to conventional construction.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a pitch bearing assembly for a wind turbine having an improved load distribution. More particularly, the pitch assembly includes a first pitch bearing, a second pitch bearing, and at least one spacer configured axially between and contacting the first and second pitch bearings. The first pitch bearing includes a first outer race and a first inner race rotatable relative to the first outer race via a first set of rolling elements. The second pitch bearing includes a second outer race and a second inner race rotatable relative to the second outer race via a second set of rolling elements. Further, at least a portion of the first pitch bearing and at least a portion of the second pitch bearing are axially aligned between the rotatable hub and the rotor blade in a generally span-wise direction. Further, at least a portion of the first pitch bearing and at least a portion of the second pitch bearing are axially aligned between the rotatable hub and the rotor blade in a generally span-wise direction.

Thus, the pitch assembly of the present disclosure provides many advantages not present in the prior art. For example, the twin-bearing configuration provides races that are spaced axially apart, thereby providing a better load distribution therebetween and less contact angles of the rolling elements. As such, the truncation safety margin of the bearing is improved. In addition, the increased axial dimensions over prior art bearings lead to stiffening of the blade-to-bearing joint. Moreover, the overall cage movement is reduced due to decreased raceway deformation, hence less cage wear. Further, the potato chip effect as described herein can be avoided.

Referring now to the drawings, FIG. 1 illustrates a side view of one embodiment of a wind turbine 10. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator (not shown) positioned within the nacelle 16 to permit electrical energy to be produced.

Figure 2:
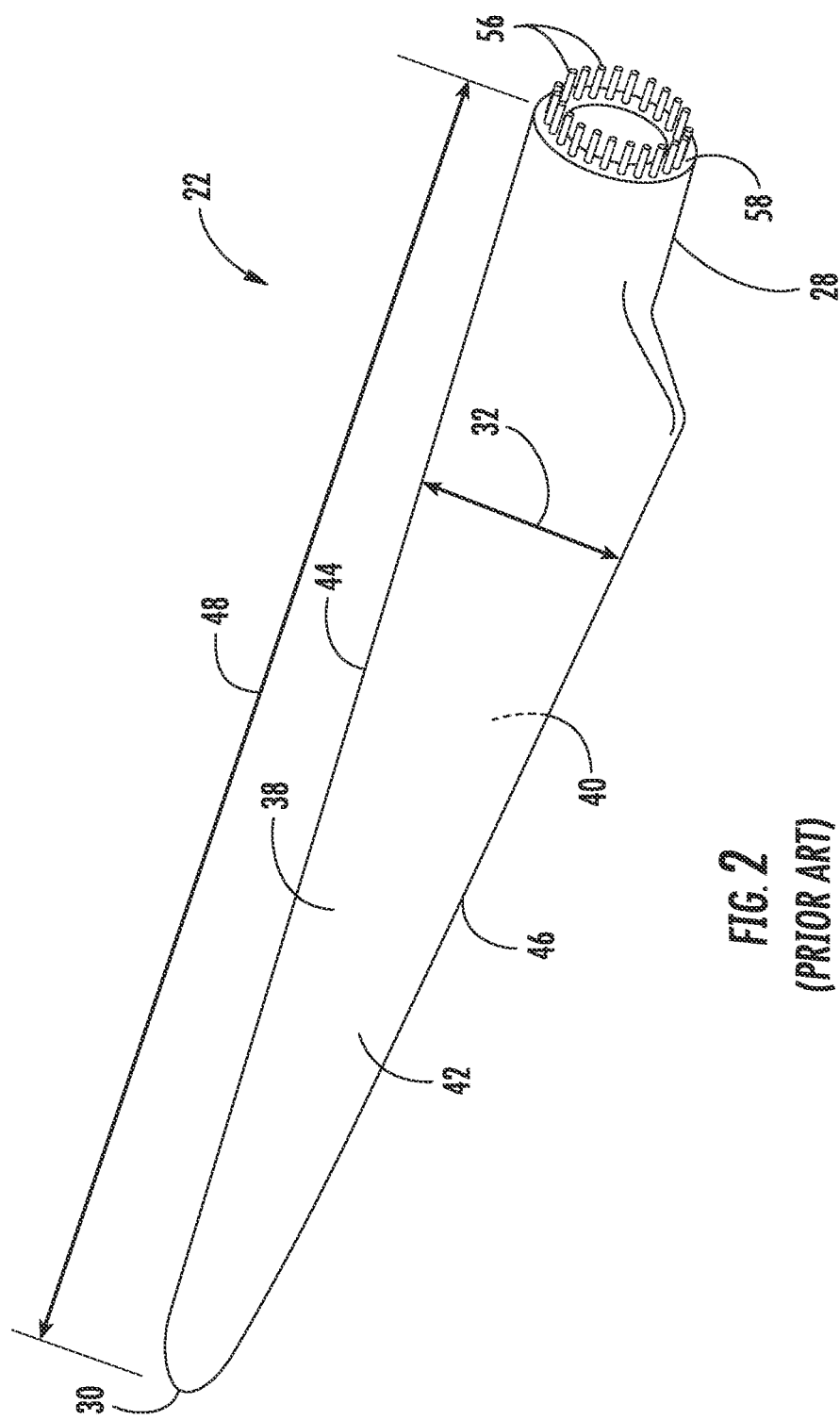
FIG. 2 illustrates a perspective view of one of the rotor blades of the wind turbine shown in FIG. 1.

Referring now to FIG. 2, a perspective view of one of the rotor blades 22 shown in FIG. 1 is illustrated in accordance with aspects of the present subject matter. As shown, the rotor blade 22 includes a blade root 28 configured for mounting the rotor blade 22 to the hub 20 of a wind turbine 10 (FIG. 1) and a blade tip 30 disposed opposite the blade root 28. A body 42 of the rotor blade 22 may extend lengthwise between the blade root 28 and the blade tip 30 and may generally serve as the outer shell of the rotor blade 22. As is generally understood, the body 42 may define an aerodynamic profile (e.g., by defining an airfoil shaped cross-section, such as a symmetrical or cambered airfoil-shaped cross-section) to enable the rotor blade 22 to capture kinetic energy from the wind using known aerodynamic principles. Thus, the body 42 may generally include a pressure side 40 and a suction side 38 extending between a leading edge 44 and a trailing edge 46. Additionally, the rotor blade 22 may have a span 48 defining the total length of the body 42 between the blade root 28 and the blade tip 30 and a chord 32 defining the total length of the body 42 between the leading edge 44 and the trailing edge 46. As is generally understood, the chord 32 may vary in length with respect to the span 48 as the body 42 extends from the blade root 28 to the blade tip 30.

Moreover, as shown, the rotor blade 22 may also include a plurality of bolts 56 for coupling the blade root 28 to the hub 20 of the wind turbine 10. In general, each bolt 56 may be coupled to and extend from blade root 28 so as to project outwardly from a root end 58 of the blade root 28. By projecting outwardly from the root end 58, the root bolts 56 may generally be used to couple the blade root 28 to the hub 20 (e.g., via a pitch bearing 50 (FIG. 3)), as will be described in greater detail below.

Figure 3:
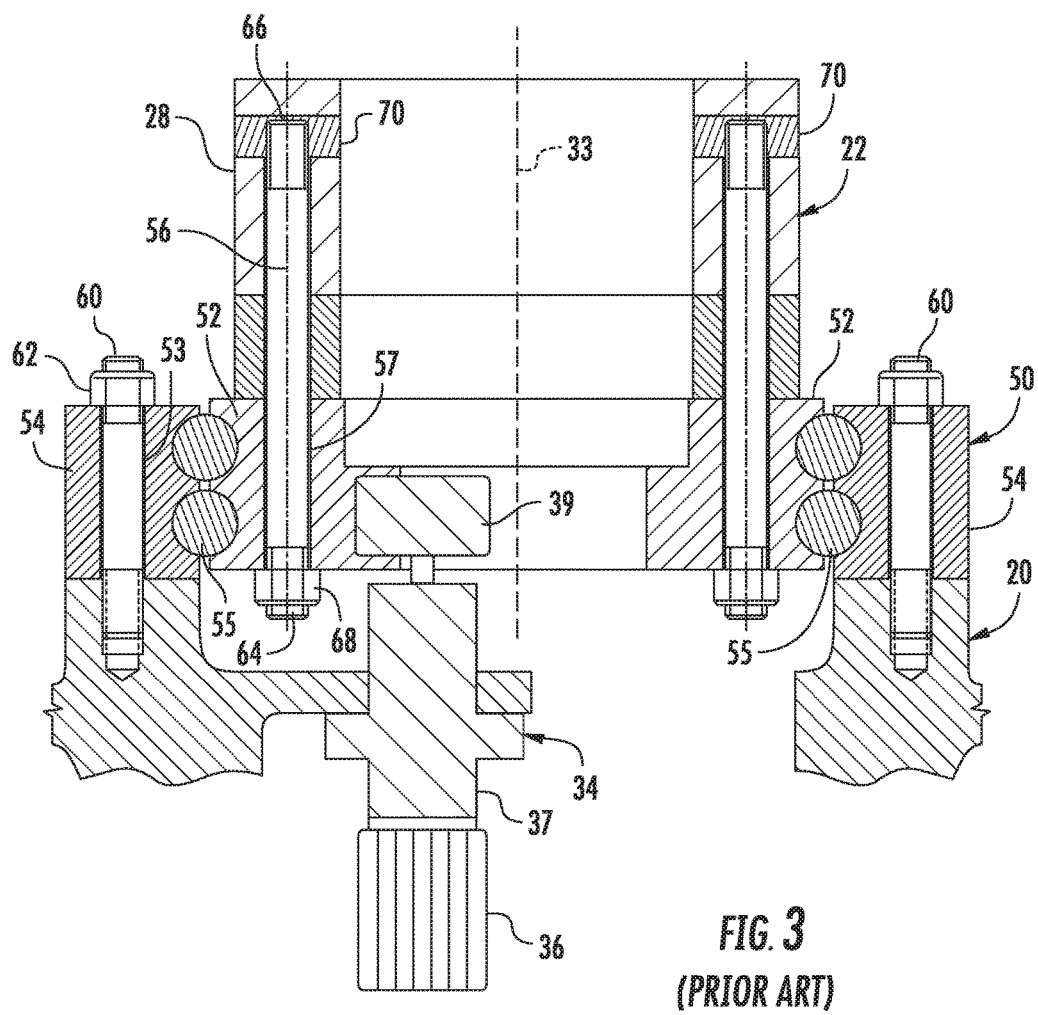
FIG. 3 illustrates a cross-sectional view of a rotor blade coupled to a rotatable hub of a wind turbine via a pitch bearing according to conventional construction.

Referring now to FIG. 3, a cross-sectional view of an interface between one of the rotor blades 22 of the wind turbine 10 of FIG. 1 and the rotatable hub 18 according to conventional construction is illustrated. As shown, the rotor blade 22 is mounted to the hub 18 via a pitch bearing 50. More specifically, the pitch bearing 50 includes an outer race 54 and an inner race 52 rotatable relative to the outer race 54 via a plurality of rolling elements 55. The outer race 54 may generally be configured to be mounted to the hub 20. For example, as shown, the outer race 54 defines a plurality of axial openings 53 configured to receive corresponding hub bolts 60 and/or any other suitable fastening mechanisms, e.g. attachment nuts 62. Similarly, the inner race 52 may be configured to be mounted to the blade root 28 of the rotor blade 22. For example, the inner race 52 may define a plurality of axial openings 57 configured to receive corresponding root bolts 56 and/or any other suitable fastening mechanisms. More specifically, as shown, each root bolt 56 may extend between a first end 64 and a second end 66. The first end 64 of each root bolt 56 may be configured to be coupled to a portion of the inner race 52, such as by coupling the first end 64 to the inner race 52 using an attachment nut 68 and/or other suitable fastening mechanism. Additionally, the second end 66 of each root bolt 56 may extend into and may be secured within an axially extending, threaded opening of a barrel nut 70. Alternatively, the second end 66 of each root bolt 56 may simply extend into the blade root 28 and the barrel nut may be absent.

Accordingly, rotation of the inner race 52 rotates the rotor blade 22 about its pitch axis 33. More specifically, as shown, each rotor blade 22 may include a pitch adjustment mechanism 34 configured to rotate each rotor blade 22 about its pitch axis 33. Further, each pitch adjustment mechanism 34 may include a pitch drive motor 36 (e.g., any suitable electric motor), a pitch drive gearbox 37, and a pitch drive pinion 39. In such embodiments, the pitch drive motor 36 may be coupled to the pitch drive gearbox 37 so that the pitch drive motor 36 imparts mechanical force to the pitch drive gearbox 37. Similarly, the pitch drive gearbox 37 may be coupled to the pitch drive pinion 39 for rotation therewith. The pitch drive pinion 39 may, in turn, be in rotational engagement with the inner race 52 of the pitch bearing 50 coupled between the hub 20 and the rotor blade 22 such that rotation of the pitch drive pinion 39 causes rotation of the pitch bearing 50. Thus, in such embodiments, rotation of the pitch drive motor 36 drives the pitch drive gearbox 37 and the pitch drive pinion 39, thereby rotating the pitch bearing 50 and the rotor blade 22 about the pitch axis 33.

Figure 4:
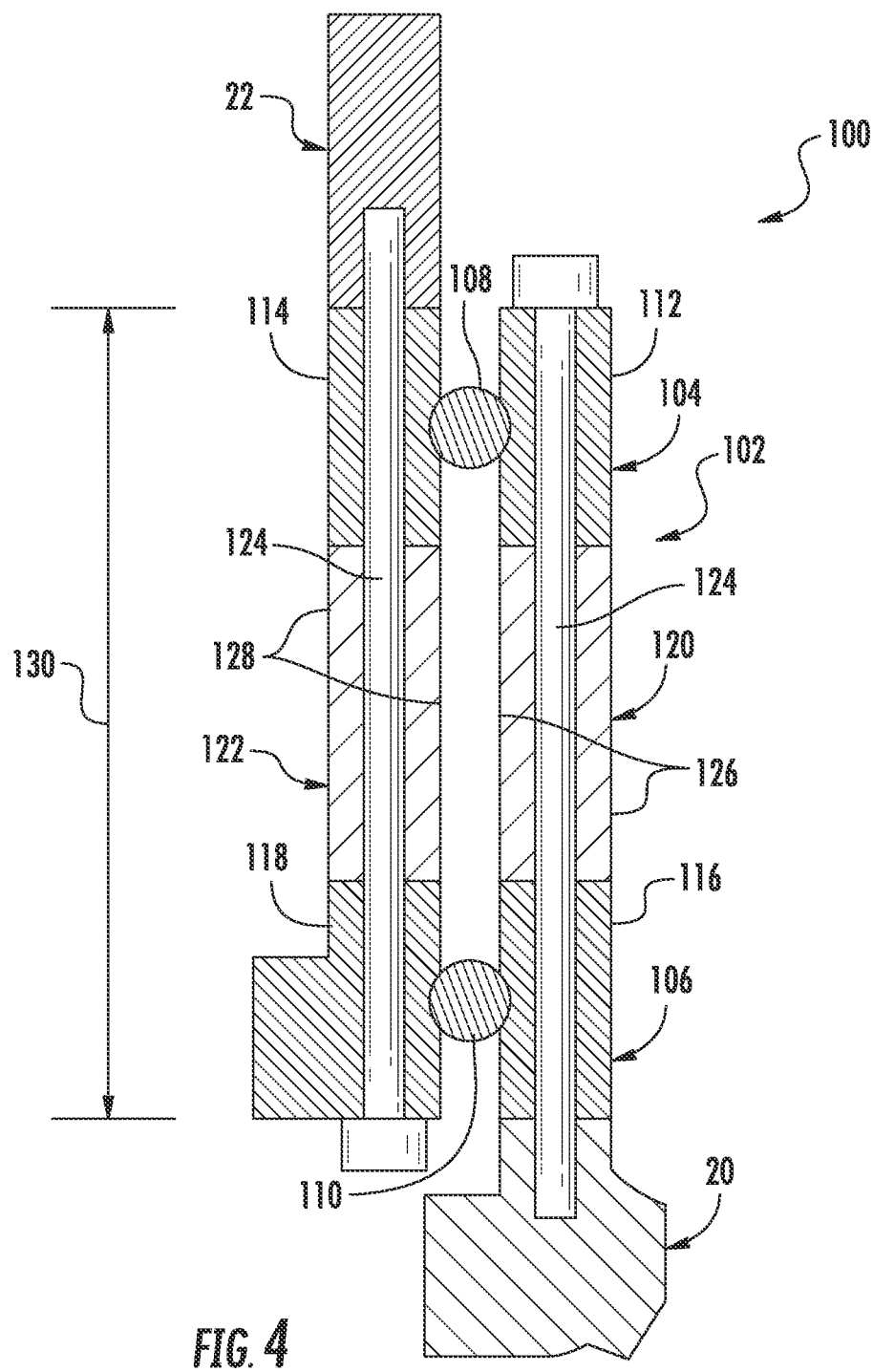
FIG. 4 illustrates a partial, cross-sectional view of one embodiment of a rotor blade assembly, particularly illustrating a pitch assembly according to the present disclosure.
Figure 5:
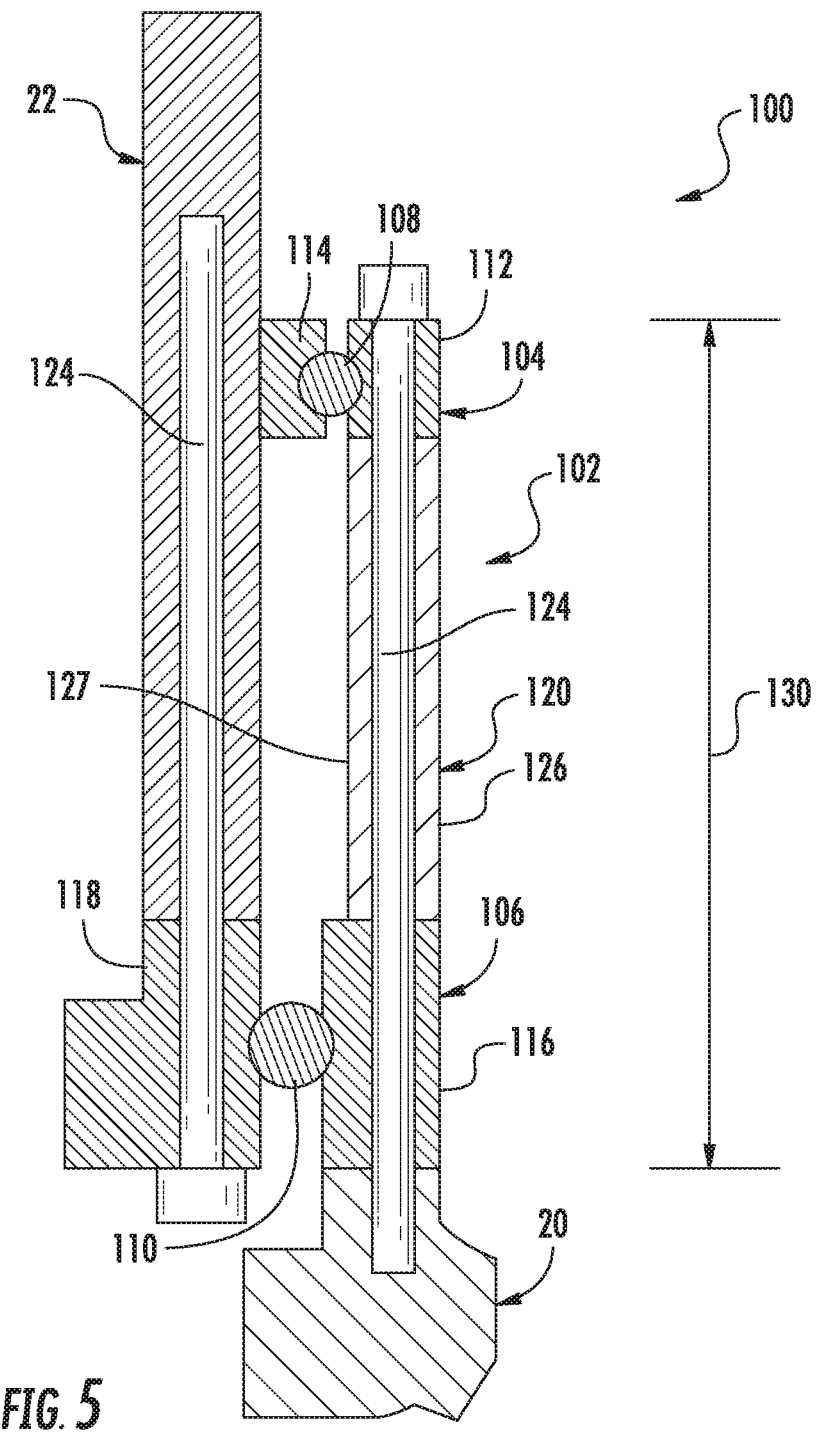
FIG. 5 illustrates a partial, cross-sectional view of another embodiment of a rotor blade assembly, particularly illustrating a pitch assembly according to the present disclosure.
Figure 6:
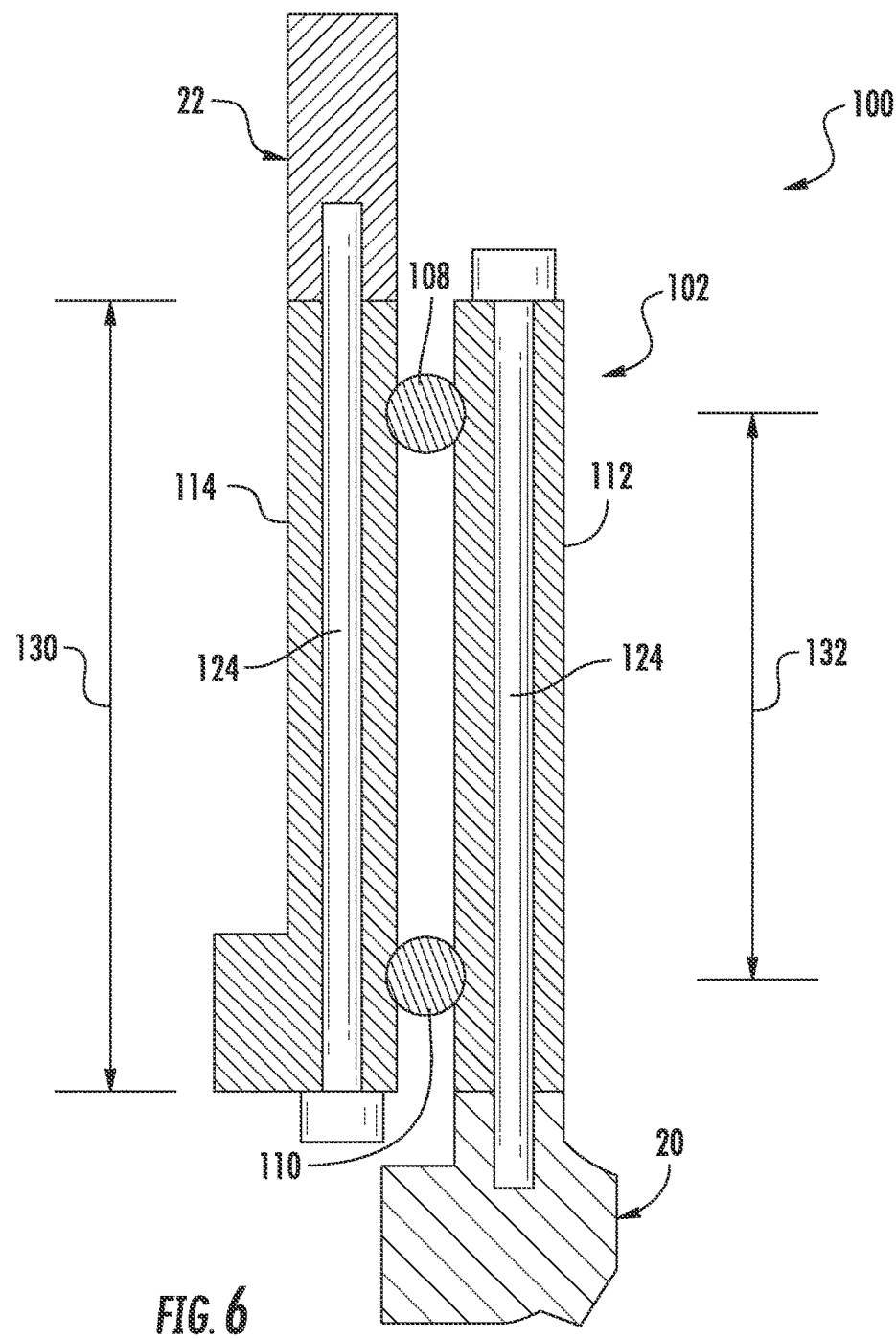
FIG. 6 illustrates a partial, cross-sectional view of yet another embodiment of a rotor blade assembly, particularly illustrating a pitch assembly according to the present disclosure.

A typical pitch bearing 50 as shown in FIG. 3 can experience uneven loading, thereby resulting in higher stress and/or damage to the pitch bearing. Thus, as shown, in FIGS. 4-6, several views of a rotor blade assembly 100 having an improved pitch assembly 102 suitable for mounting a rotor blade 22 to the hub 20 of a wind turbine 10 is illustrated in accordance with aspects of the present subject matter. More specifically, FIG. 4 illustrates a partial, cross-sectional view of a rotor blade assembly 100, particularly illustrating a pitch assembly 102 according to the present disclosure; FIG. 5 illustrates a partial, cross-sectional view of another embodiment of the pitch assembly 102 according to the present disclosure; and FIG. 6 illustrates a partial, cross-sectional view of yet another embodiment of the pitch bearing assembly 102 according to the present disclosure.

As shown particularly in FIGS. 4 and 5, the pitch assembly 102 may generally include a first pitch bearing 104 and a second pitch bearing 106. Further, the first pitch bearing 104 includes a first outer race 112 and a first inner race 114 rotatable relative to the first outer race 112 via a first set of rolling elements 108 disposed between the outer and inner races 112, 114. Similarly, the second pitch bearing 106 includes a second outer race 116 and a second inner race 118 rotatable relative to the second outer race 116 via a second set of rolling elements 110 disposed between the outer and inner races 116, 118. As is generally understood, the first and second inner races 114, 118 may be configured to rotate relative to the first and second outer races 112, 116 (via the rolling elements 108, 110) to allow the pitch angle of each rotor blade 22 to be adjusted (i.e. to allow the rotor blade 22 to rotate about its pitch axis 33 as shown in FIG. 1). In one embodiment, such relative rotation of the first and second outer and inner races may be achieved using a pitch adjustment mechanism 34 mounted within a portion of the hub 20 (as shown in FIG. 3). It should be understood that the rolling elements 108, 110 as described herein may be any suitable rolling elements, e.g. balls.

Referring still to FIG. 4, in certain embodiments, the first and second outer races 112, 116 may be secured to the hub 20, whereas the first and second inner races 114, 118 may be secured to the rotor blade 22. Further, it should be understood that the inner and outer races may be secured to the rotor blade 22 and/or hub 20 via any suitable means. For example, as shown in FIG. 4, the first and second inner 114, 118 and outer 112, 116 races may be mounted to the rotor blade 22 and the hub 20, respectively, via one or more fasteners 124 or bolts, similar to the root bolts 56 and hub bolts 60 of FIG. 3. Alternatively, one or more of the races may be secured to the rotor blade 22 or the hub 20 via an interference fit. For example, as shown in FIG. 5, the first inner race 114 may be secured to the rotor blade 22 via an interference fit, whereas the remaining races may be secured via fasteners 124. In additional embodiments, it should be understood that any suitable configuration using any combination of fasteners, an interference fit, or similar may be used to secure the inner and outer races to either the hub 20 or the blade 22.

Still referring to FIGS. 4 and 5, the pitch assembly 102 may also include at least one spacer 120, 122 configured axially between the first and second pitch bearings 104, 106. In addition, as shown, each of the spacer(s) 120, 122 are configured to contact each of the first and second pitch bearings 104, 106, respectively. For example, as shown in FIG. 4, the pitch assembly 102 may include a first spacer 120 configured between the first and second outer races 112, 116 and a second spacer 122 configured between the first and second inner races 114, 118. Thus, in certain embodiments, the first and second spacers 120, 122 may be configured to form at least one continuous surface 126, 128 with the first and second outer races 112, 116 and the first and second inner races 114, 118 of the first and second pitch bearings 104, 106, respectively. More specifically, as shown, the first spacer 120 forms two continuous surfaces (both labeled 126) with the first and second outer races 112, 116, whereas the second spacer 122 forms two continuous surfaces (both labeled 128) with the first and second inner races 114, 118. Alternatively, as shown in FIG. 5, the pitch assembly 102 includes a single spacer 120 configured between the first and second outer races 112, 116 so as to form continuous surface 126. In such an embodiment, as shown, an opposite side of the spacer 120 (i.e. the side closest to the rolling elements 108, 110), however, forms a discontinuous surface 127 with the first and second outer races 112, 116.

In particular embodiments, the spacer(s) 120, 122 may include any suitable shape and may be constructed of any suitable material. For example, as shown, the spacer(s) 120, 122 include a generally circular shape corresponding to the cross-sectional shape of first and second inner and outer races, respectively. In addition, the spacer(s) 120, 122 may be formed of a single, unitary piece of material or may be formed of multiple components. In further embodiments, the spacers(s) 120, 122 may be separate components from the inner and outer races or may be integral with the inner and outer races.

Referring generally to FIGS. 4-6, in particular embodiments, at least a portion of the first pitch bearing 104 and at least a portion of the second pitch bearing 106 may be axially aligned between the hub 20 and the rotor blade 22 in a generally span-wise direction. For example, as shown in FIG. 4, the inner 114, 118 and outer races 112, 116, as well as the rolling elements 108, 110 of each of the first and second pitch bearings 104 106 are axially aligned with each other. Thus, the first spacer 120 is axially aligned between the first and second outer races 112, 116 and the second spacer 122 is axially aligned between the first and second inner races 114, 118. In further embodiments, as shown in FIG. 5, the first outer race 112 may be axially aligned with the second outer race 116 in the span-wise direction. In additional embodiments, the first and second sets of rolling elements 108, 110 may be axially aligned in the span-wise direction. Further, in certain embodiments, the first and second pitch bearings 104, 106 may be the same size or may be different sizes. For example, as shown in FIG. 4, the first and second pitch bearings 104, 106 are substantially the same size. Alternatively, as shown in FIG. 5, the first pitch bearing 104 may be smaller than the second pitch bearing 106 or vice versa.

Referring now to FIG. 6, another embodiment of the pitch assembly 102 of the present disclosure is illustrated. As shown, the pitch assembly 102 includes an outer race 112 and an inner race 114 rotatable relative to the outer race 112 via a plurality of rolling elements 108, 110. More specifically, as shown, the rolling elements include a first row 108 of rolling elements axially aligned with a second row 110 of rolling elements in a generally span-wise direction of the rotor blade 22. Further, the inner and outer races 112, 114 define an overall height 130 of the pitch assembly 102. In addition, the first and second rows 108, 110 of rolling elements are separated by a predetermined distance 132. Thus, a ratio of the predetermined distance 132 to the overall height 130 can be designed to evenly distribute loads and/or to provide improved stiffening of the blade-to-bearing joint. For example, in certain embodiments, the ratio of the predetermined distance 132 to the overall height 130 is at least about 0.5. In further embodiments, the ratio may be more than 0.5 or less than 0.5.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotor blade assembly for a wind turbine, comprising;
a rotatable hub;
at least one rotor blade configured with the rotatable hub and comprising a root end and a tip end, the at least one rotor blade defining a longitudinal axis from the root end to the tip end that is parallel with a pitch axis of the rotor blade; and,
a pitch assembly coupling the root end of the rotor blade to the rotatable hub and configured to rotate the at least one rotor blade about the pitch axis, the pitch assembly comprising:
a first pitch bearing having a first outer race and a first inner race rotatable relative to the first outer race via a first set of rolling elements,
a second pitch bearing having a second outer race and a second inner race rotatable relative to the second outer race via a second set of rolling elements, the first and second outer races being mounted to the rotatable hub via one or more fasteners, the second inner race being mounted to the rotor blade via one or more fasteners, the first inner race abutting against an outer surface of a blade root of the rotor blade and secured thereto via an interference fit, the first inner race and the second inner race are not aligned in an axial direction, the axial direction being parallel with the pitch axis, and
at least one spacer configured axially between and contacting the first and second pitch bearings.

2. The rotor blade assembly of claim 1, wherein at least a portion of the first pitch bearing and at least a portion of the second pitch bearing are axially aligned between the rotatable hub and the rotor blade in a span-wise direction.

3. The rotor blade assembly of claim 1, wherein the at least one spacer is configured between at least one of the first and second outer races or the first and second inner races.

4. The rotor blade assembly of claim 3, wherein the at least one spacer is configured to form at least one continuously smooth surface with at least one of the first and second outer races or the first and second inner races of the first and second pitch bearings.

5. The rotor blade assembly of claim 1, wherein the at least one spacer comprises a circular shape corresponding to the cross-sectional shape of at least one of the first or second inner or outer races.

6. The rotor blade assembly of claim 1, wherein the first outer race is axially aligned with the second outer race in the span-wise direction.

7. The rotor blade assembly of claim 5, wherein the first and second sets of rolling elements are axially aligned in the span-wise direction.

8. The rotor blade assembly of claim 1, wherein the first pitch bearing is smaller than the second pitch bearing.

* * * * *